(12) United States Patent
Kim et al.

(10) Patent No.: US 7,570,453 B2
(45) Date of Patent: Aug. 4, 2009

(54) METHOD AND APPARATUS REDUCING DATA DAMAGE FROM MECHANICAL SHOCK IN A HARD DISK DRIVE

(75) Inventors: Myeong-Eop Kim, San Jose, CA (US); Gregory Tran, Santa Clara, CA (US); Tho Pham, Milpitas, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 498 days.

(21) Appl. No.: 11/297,873

(22) Filed: Dec. 7, 2005

(65) Prior Publication Data

US 2007/0127154 A1 Jun. 7, 2007

(51) Int. Cl.
*G11B 5/012* (2006.01)
(52) U.S. Cl. .................................................. 360/97.01
(58) Field of Classification Search .............. 360/97.01, 360/97.02, 98.08, 99.05, 99.12, 133; 720/733
See application file for complete search history.

(56) References Cited

U.S. PATENT DOCUMENTS

| 5,724,216 | A | * | 3/1998 | Iftikar et al. ................ 360/133 |
| 6,212,029 | B1 | * | 4/2001 | Fioravanti ................ 360/97.01 |
| 6,917,491 | B2 | * | 7/2005 | Choi ........................ 360/97.01 |
| 7,085,098 | B1 | * | 8/2006 | Yang et al. ................ 360/97.03 |
| 7,133,248 | B2 | * | 11/2006 | Shin et al. ................ 360/97.01 |
| 7,322,037 | B2 | * | 1/2008 | Choi .......................... 720/733 |
| 2001/0001254 | A1 | * | 5/2001 | Nagl et al. ................ 360/97.01 |
| 2005/0225895 | A1 | * | 10/2005 | Nishida et al. ........... 360/97.01 |
| 2006/0092558 | A1 | * | 5/2006 | Cho et al. ................ 360/97.02 |

* cited by examiner

*Primary Examiner*—Tianjie Chen
(74) *Attorney, Agent, or Firm*—Earle Jennings; GSS Law Group

(57) ABSTRACT

Invention protects the data region of a disk surface in hard disk drive, using a facing surface containing a radial bump near an outside region radially beyond the data region. The facing surface and radial bump may belong to a disk base, a disk damper, a disk cover and/or a cover insert attached to the disk cover, as well as the hard disk drive including at least one facing surface and radial bump. The method of making the disk base, the disk cover, the cover insert for the disk cover, the disk damper, and/or the hard disk drive, as well as the products of these manufacturing processes.

15 Claims, 5 Drawing Sheets

METHOD AND APPARATUS REDUCING DATA DAMAGE FROM MECHANICAL SHOCK IN A HARD DISK DRIVE

TECHNICAL FIELD

This invention relates to hard disk drive components, in particular, to components reducing damage to the disk data caused by mechanical shock to a hard disk drive.

BACKGROUND OF THE INVENTION

Contemporary hard disk drives include an actuator assembly pivoting through an actuator pivot to position one or more read-write heads, embedded in sliders over a rotating disk surface. The data stored on the rotating disk surface is typically arranged in concentric tracks collectively referred to as the data region. To access the data of a track, a servo controller first positions the read-write head by electrically stimulating the voice coil motor, which couples through the voice coil and an actuator arm to move a head gimbal assembly in positioning the slider close to the track. This process is often referred to as a track seeking process. Once the slider and its embedded read-write head are close to the track a second process known as a track following process takes over the control of positioning the read-write head to access the track.

To minimize air turbulence and its affect upon the read-write head's access of data, the disk enclosures of contemporary disk drives are made to provide very little room between the rotating disk surface and the enclosure wall or an internal disk damper. When the hard disk drive is mechanically shocked, the disk(s) tend to flex and can in doing so, make contact with the enclosure and/or disk damper. This contact tends to damage the data stored in the contact region, degrading the reliability of the hard disk drive.

What is needed are hard disk drives which are better able to withstand mechanical shock while reducing air turbulence at the actuator assembly, in particular at the read-write head(s). More specifically, a mechanism is needed to protect a disk surface from contact while insuring the reduction of air turbulence.

SUMMARY OF THE INVENTION

The invention protects the data region of a disk surface in a hard disk drive. It includes a facing surface containing a radial bump near an outside region radially beyond the data region of the disk surface. The invention operates as follows. When the hard disk drive experiences a mechanical shock the disk, including the disk surface, tends to bend. The radial bump makes contact with the outside region and the data region avoids contact with the facing surface. By avoiding contact with the data region, the possibility of damaging the data region is diminished.

The radial bump may be distributed at an essentially constant radius about the spindle pivot of the spindle motor in the hard disk drive. The facing surface and the radial bump may belong to a disk base, a disk damper, a disk cover and/or a cover insert attached to the disk cover. The invention may include the disk base, the disk cover, the cover insert for the disk cover, and/or the disk damper, as well as the hard disk drive including at least one radial bump and facing surface.

The invention includes the method of making any one or more of the disk base, the disk cover, the cover insert for the disk cover, and/or the disk damper as well as the method of making the hard disk drive. The invention includes the disk base, the disk cover, the disk damper, and the hard disk drive as products of these manufacturing processes.

The facing surface may in some applications include a radial depression defining an edge of the radial bump. The radial bump may include a contact surface coplanar with the facing surface, possibly excluding the radial depression. The radial depression may possess a curved profile and/or a polygonal profile in a radial cross section. The radial depression may further include a triangular profile in the radial cross section.

DETAILED DESCRIPTION

This invention relates to hard disk drive components, in particular, to components reducing damage to the disk data caused by mechanical shock.

Figure 1:
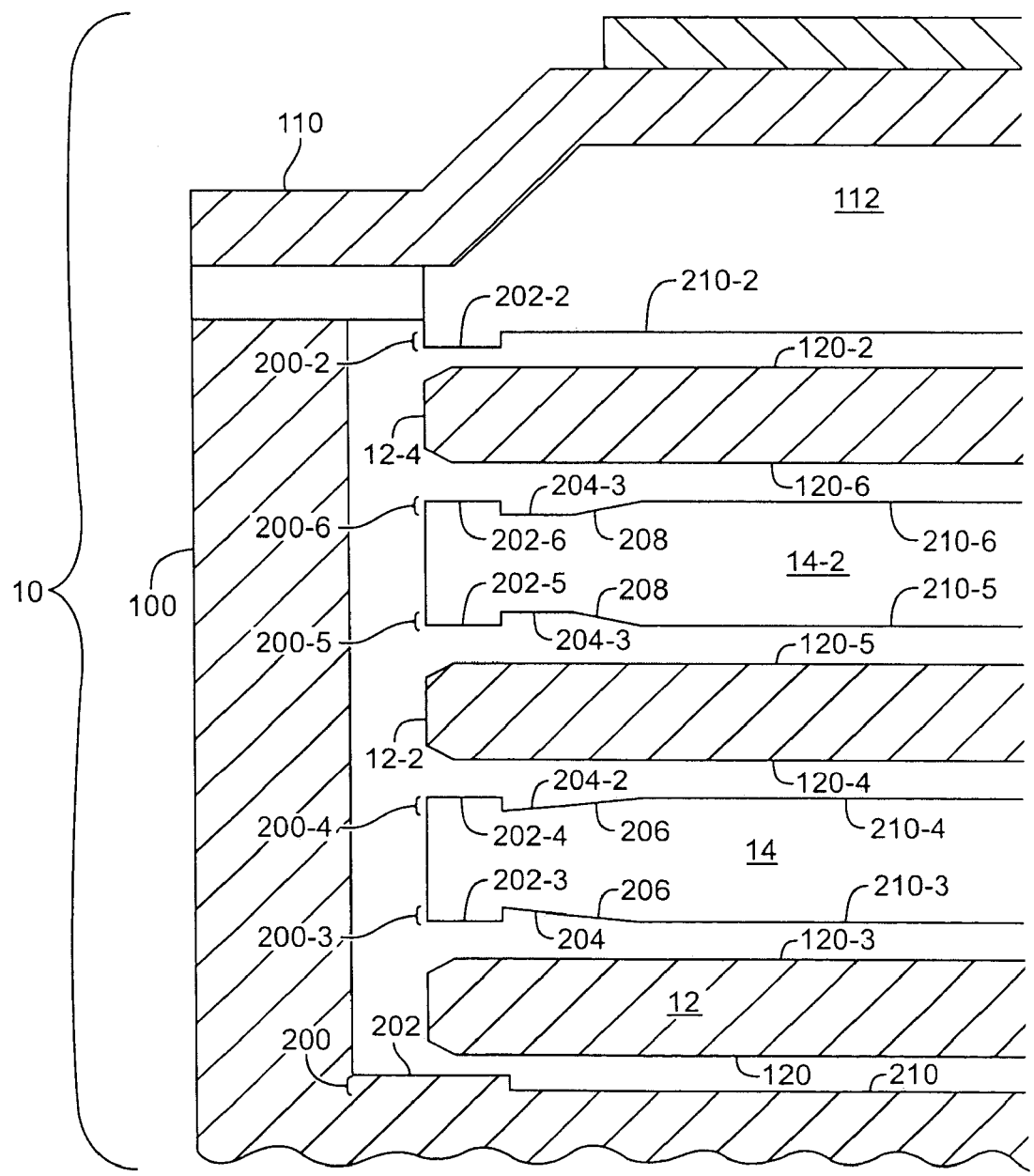
FIG. 1 shows various aspects of the invention's apparatus included a radial cross section in a hard disk drive.
Figure 4B:
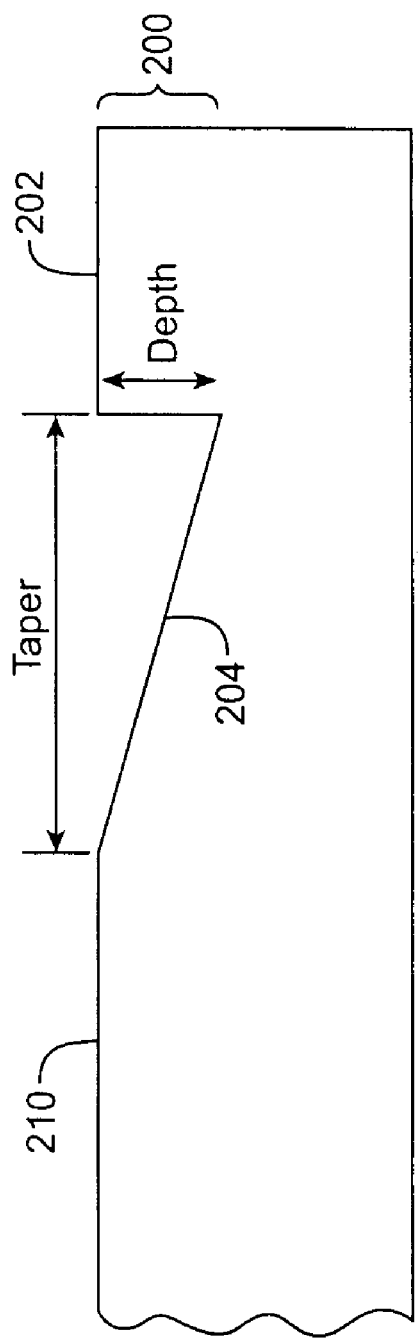
FIG. 4B shows details of the radial depression defining an edge of the radial bump.
Figure 4A:
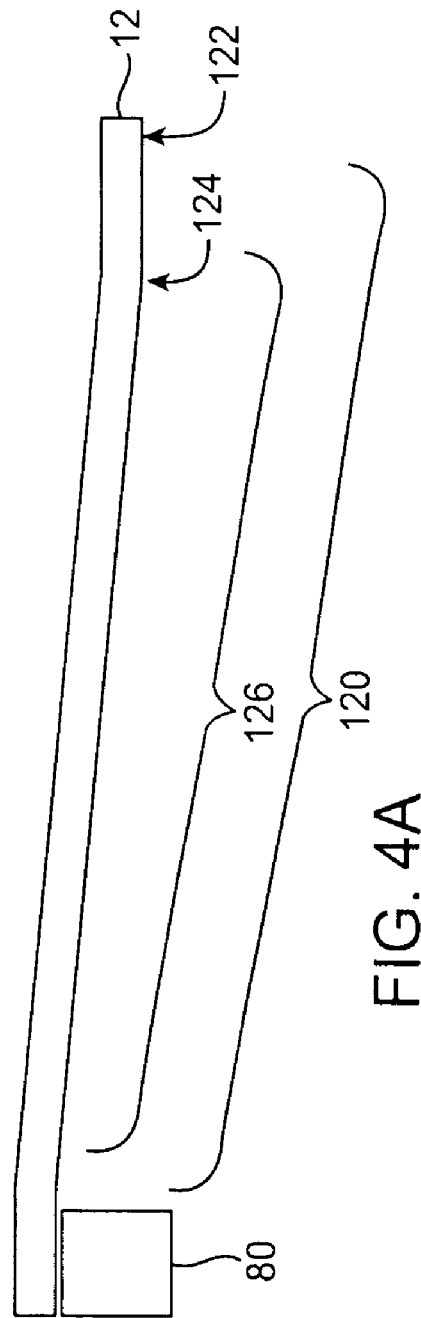
FIG. 4A shows a detailed view of the bending of the disk of FIG. 1 when the hard disk drive experiences mechanical shock.

The invention protects the data region 126 of a disk surface 120 in a hard disk drive 10 as shown in FIG. 4A. It includes a facing surface 210 containing a radial bump 200 near an outside region 122 radially beyond the data region of the disk surface as shown in FIG. 1.

The invention operates as follows. When the hard disk drive 10 experiences a mechanical shock, the disk 12 including the disk surface 120 tends to bend as shown in FIG. 4A. The radial bump 200 makes contact with the outside region 122 and the data region 126 avoids contact with the facing surface 210 as shown in FIG. 1. By avoiding contact with the data region, the possibility of damaging the data region is diminished.

The radial bump 200 may be distributed at an essentially constant radius about the spindle pivot of the spindle motor 80 in the hard disk drive 10, as shown in FIGS. 1, 3, 5A and 5B. The facing surface 210 and the radial bump may belong to a disk base 100, a disk damper 14, a disk cover 110 and/or a cover insert 112 attached to the disk cover. The invention may include the disk base, the disk cover, the cover insert for the disk cover, and/or the disk damper, as well as the hard disk drive including at least one radial bump and facing surface.

The facing surface 210 may, in some applications, include a radial depression 204 defining an edge of the radial bump 200. The radial depression may possess a polygonal profile 208 of FIG. 1 in a radial cross section 32 shown in FIG. 3. The radial depression may further include a triangular profile 206 in the radial cross section.

The radial bump 200 may include a contact surface 202 coplanar with the facing surface 210. Further, the contact surface may be coplanar with the facing surface excluding the radial depression 204.

Figure 2:
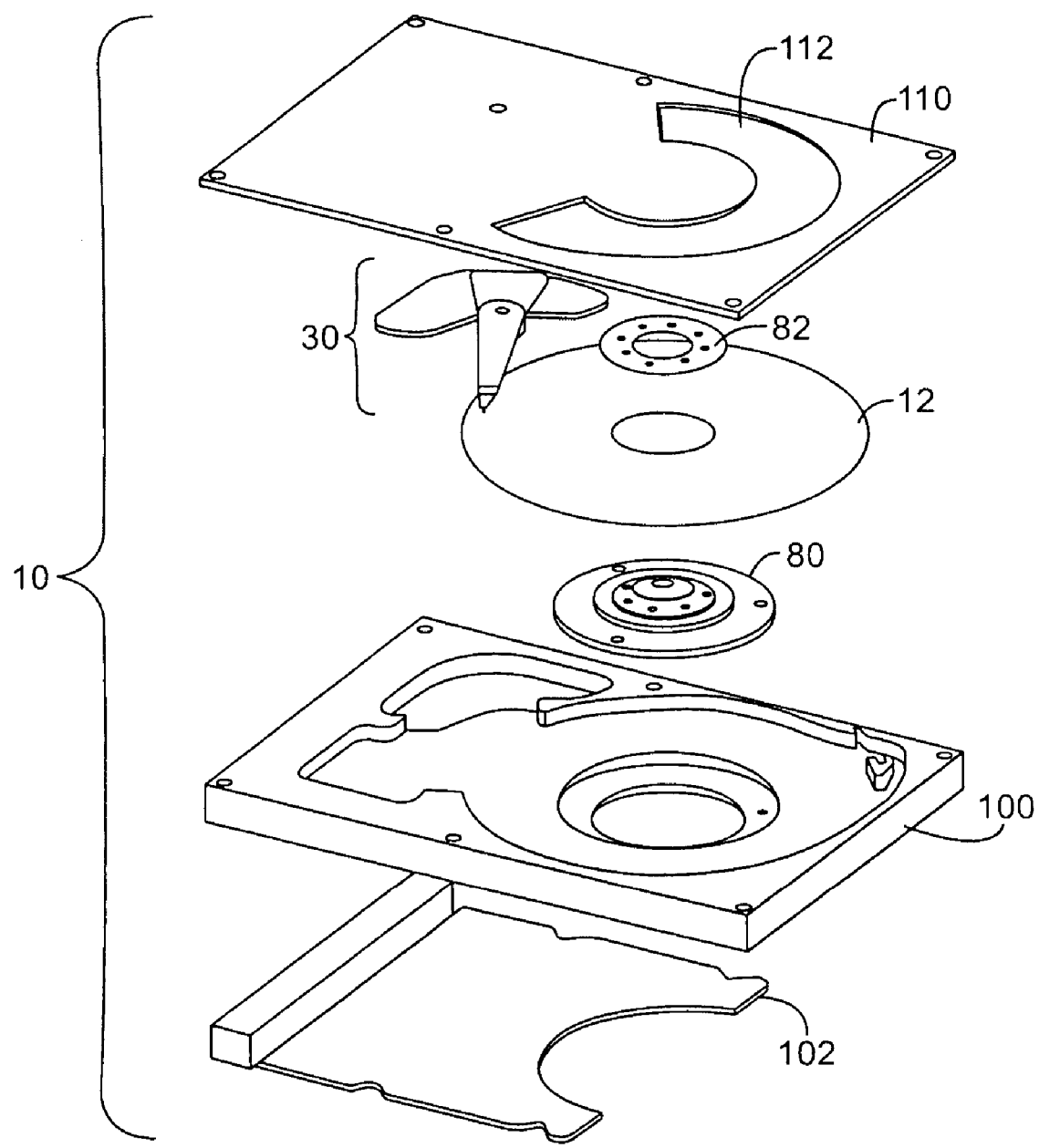
FIG. 2 shows an exploded view of the primary components of the hard disk drive of FIG. 1.
Figure 3:
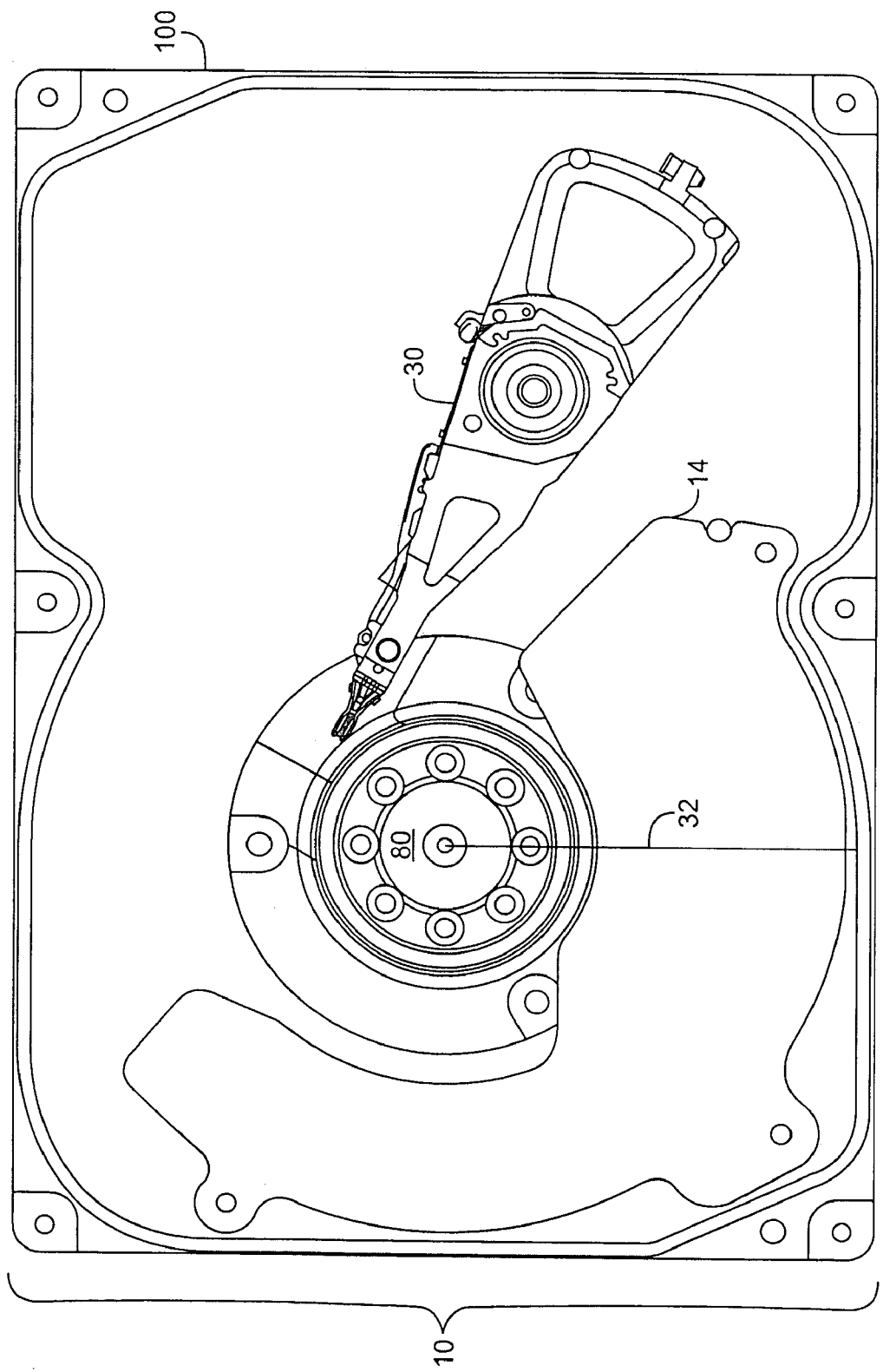
FIG. 3 shows a top view of the hard disk drive with the disk cover removed showing the radial cross section cut.

Looking with more detail at FIG. 1, the disk base 100 is shown including the facing surface 210 and the radial bump 200 with its contact surface 202. The facing surface is near the disk surface 120. The disk cover 110 is shown attached to a cover insert 112. The cover insert includes the second facing surface 210-2 and the second radial bump 200-2. FIG. 2 shows the cover insert stamped into the disk cover. Both the disk base 100 and the disk cover are shown without a radial depression.

The disk damper 14 of FIG. 1 includes the following. The third facing surface 210-3 joins the radial depression 204, which terminates at the third radial depression 204-3. The fourth facing surface 210-4 joins the second radial depression 204-2, defining an edge of the fourth radial bump 200-4. Both the radial depression and the second radial depression have a triangular profile 206 in the radial cross section.

The second disk damper 14-2 includes the following. The fifth facing surface 210-5 joins the third radial depression 204-3, which terminates at the fifth radial bump 200-5. The sixth facing surface 210-6 joins the fourth radial depression 204-4, defining an edge of the sixth radial bump 200-6. The third radial depression has a polygonal profile 208 in the radial cross section. All of these radial depressions may have a curved profile in the radial cross section.

In some embodiments, a radial depression 204 may have a depth of at least one tenth millimeter (mm) and a taper of at least one mm as shown in FIG. 4B. In other embodiments, the radial depression may have a depth of at least fifteen hundredths of a mm and a taper of at least one and a half mm. The radial depression may further have a depth of at least two tenths of a mm and a taper of at least two mm. In additional embodiments, the radial depression may further have a depth of three tenths of a mm and a taper of at least three mm.

In certain embodiments of the invention, the radial bump 200 may be used wherever the facing surface 210 is within a short distance of the disk surface 120. The short distance may be at most one mm. The radial depression 204 may be used wherever the facing surface is within a short distance of at most one half a mm.

Figure 5A:
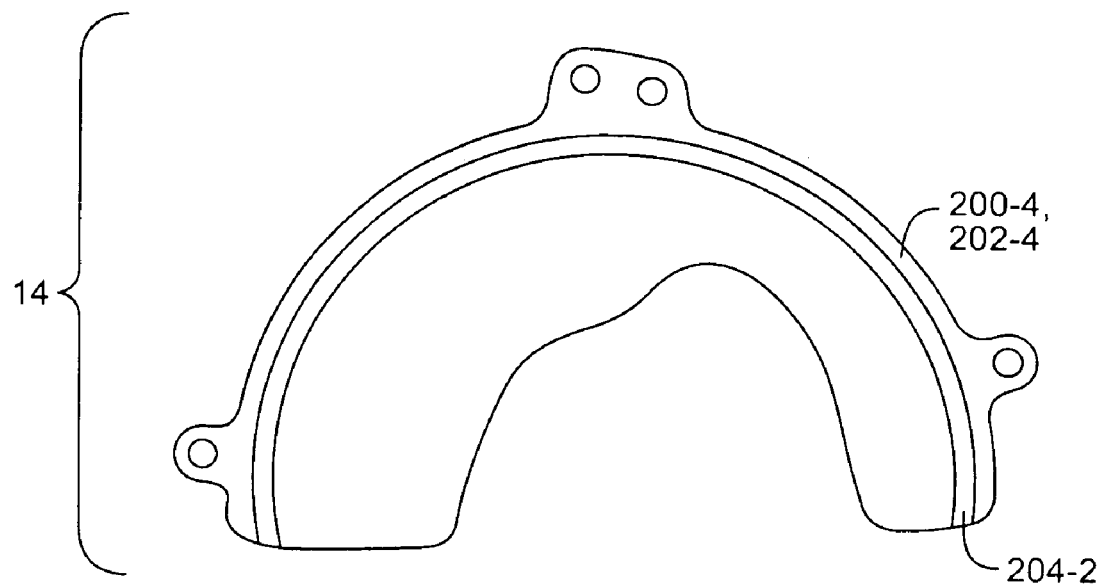
FIGS. 5A and 5B show some exemplary disk dampers including the invention's apparatus.
Figure 5B:
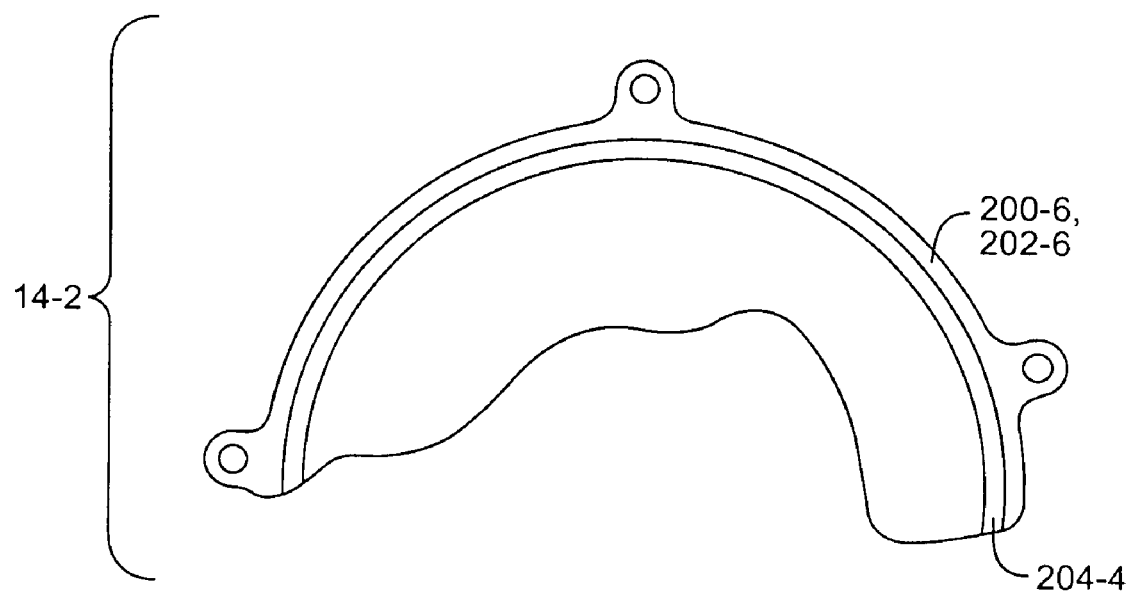

FIGS. 5A and 5B show some of the exemplary variations in the disk damper 14 to which the invention may be applied. The disk damper may be composed of aluminum, of plastic, and/or of a composite material. The composite material may be glass filled.

The invention includes the method of making the disk base 100, the disk cover 110, the cover insert 112 for the disk cover 110, and/or the disk damper 14 as well as the method of making the hard disk drive 10. The invention includes the disk base, the disk cover, the disk damper, and the hard disk drive as products of these manufacturing processes.

Making the apparatus of the invention may include molding to create the radial bump 200 of the facing surface 210. When the apparatus is included in a disk base 100 composed of metal, the molding step may further include casting the metal to create the radial bump on the facing surface included in the disk base. A suitable metal includes aluminum and aluminum alloys, but other metals and alloys may also be useable.

When a second of said apparatus is included in a disk cover 110 composed of a sheet of a metal, the molding step may further include stamping said metal sheet to create a second radial bump 200-2 on a second facing surface 210-2 included in said disk cover. A suitable metal is stainless steel, but other metals and alloys may also be usable.

When the second apparatus is included in a cover insert 112 for attachment to the disk cover 110, the molding step may further include injection molding a plastic to create the second radial bump 200-2 on the second facing surface 210-2 included in said cover insert.

When a disk damper 14 includes a third and a fourth of said apparatus, the molding step may further include injection molding a plastic to create the disk damper, which may further include: Creating the third radial bump 200-3 on a third facing surface 210-3. And creating a fourth radial bump 200-4 on a fourth facing surface 210-4.

The preceding embodiments provide examples of the invention and are not meant to constrain the scope of the following claims.

What is claimed is:

1. A hard disk drive, comprising
    a disk surface with a data region;
    a facing surface including a radial bump near an outside region radially beyond said data region of said disk surface;
    a disk cover comprising a cover insert attached to a disk cover and comprising a second of said facing surfaces and a second of said radial bumps;
    wherein said hard disk drive experiencing a mechanical shock induces a bend in the disk including said disk surface
    leading to mechanical contact between said outside region and said radial bumps and
    avoiding mechanical contact between said data region and said facing surface.

2. The hard disk drive of claim 1, wherein said facing surface further includes a radial depression defining an edge of said radial bump.

3. The hard disk drive of claim 2, wherein said radial depression has a depth of at least one tenth of a millimeter (mm) and has a taper of at least one mm.

4. The hard disk drive of claim 3, wherein said radial depression has said depth at least fifteen hundredths mm and has said taper of at least 1 and one half mm.

5. The hard disk drive of claim 4, wherein said radial depression has said depth at least two tenths mm and has said taper of at least two mm.

6. The hard disk drive of claim 2, wherein said radial depression has a curved profile in a radial cross section.

7. The hard disk drive of claim 6, wherein said radial depression has a polygonal profile in a radial cross section.

8. The hard disk drive of claim 7, wherein said radial depression has a triangular profile in said radial cross section.

9. The hard disk drive of claim 2, wherein said radial bump includes a contact surface essentially coplanar with said facing surface excluding said radial depression.

10. The hard disk drive of claim 1, wherein said radial bump includes a contact surface essentially coplanar with said facing surface.

11. The hard disk drive of claim 1, further comprising at least one of:
    a disk base, further comprising said facing surface including said radial bump near said outside region radially beyond said data region included in said disk surface; and
    a disk damper, further comprising at least one of:
        a third of said facing surface including a third of said radial bump near said outside region radially beyond said data region included in a third of said disk surface; and
        a fourth of said facing surface including a fourth of said radial bump near said outside region radially beyond said data region included in a fourth of said disk surface;
    a second of said disk damper, further comprising at least one of:

a fifth of said facing surface including a fifth of said radial bump near said outside region radially beyond said data region included in a fifth of said disk surface; and a sixth of said facing surface including a sixth of said radial bump near said outside region radially beyond said data region included in a sixth of said disk surface.

12. The hard disk drive of claim 11, comprising: said disk base.

13. The hard disk drive of claim 11, further comprising: said disk damper.

14. The disk cover for use in a hard disk drive, said hard disk drive protecting the data regions of a disk surface with a facing surface including a radial bump near an outside region radially beyond said data region of said disk surface, said disk cover comprising a cover insert, including a second facing surface and a second of said radial bumps;

wherein said hard disk drive experiencing a mechanical shock induces a bend in the disk including said disk surface leading to mechanical contact between said outside region and said radial bump and avoiding mechanical contact between said data region and said facing surface.

15. A cover insert for a disk cover, for use in a hard disk drive, said hard disk drive protecting the data regions of a disk surface with a facing surface including a radial bump near an outside region radially beyond said data region of said disk surface, said cover insert comprising a second of said facing surfaces and a second of said radial bumps;

wherein said hard disk drive experiencing a mechanical shock induces a bend in the disk including said disk surface leading to mechanical contact between said outside region and said radial bump and avoiding mechanical contact between said data region and said facing surface.

* * * * *